United States Patent [19]

August et al.

[11] 4,208,238

[45] Jun. 17, 1980

[54] GANTRY FOR USE IN THE MANUFACTURE OF LAMINAR STRUCTURES

[75] Inventors: Arthur August, Smithtown; John G. Huber, Sayville, both of N.Y.

[73] Assignee: Grumman Aerospace Corporation, Bethpage, N.Y.

[21] Appl. No.: 901,460

[22] Filed: May 1, 1978

Related U.S. Application Data

[62] Division of Ser. No. 814,472, Jul. 11, 1977, Pat. No. 4,133,711.

[51] Int. Cl.² ............................................. B66C 5/02
[52] U.S. Cl. .................................. 156/510; 156/523; 156/540; 156/584; 212/13; 414/147; 414/353

[58] Field of Search ............... 156/500, 510, 523, 527, 156/540, 584; 212/13, 14; 214/1 BT, 1 BB, 1 BV, 1 Q; 269/21, 24, 55, 56, 58, 63; 271/84, 85, 91, 103, 196

[56] References Cited

U.S. PATENT DOCUMENTS

| 2,941,675 | 6/1960 | Noble et al. ..................... 214/1 BT |
| 2,990,788 | 7/1961 | Wallace ............................... 212/13 |
| 2,995,094 | 8/1961 | Wallace ............................... 212/13 |
| 3,490,385 | 1/1970 | Gibbins et al. ..................... 212/13 |
| 4,041,875 | 8/1977 | Wallace ............................... 212/13 |

*Primary Examiner*—Caleb Weston
*Attorney, Agent, or Firm*—Richard G. Geib; Mellor A. Gill

[57] ABSTRACT

Apparatus for laying filament reinforced tape in a form, cutting same to a predetermined pattern and molding same in a preferred form.

3 Claims, 22 Drawing Figures

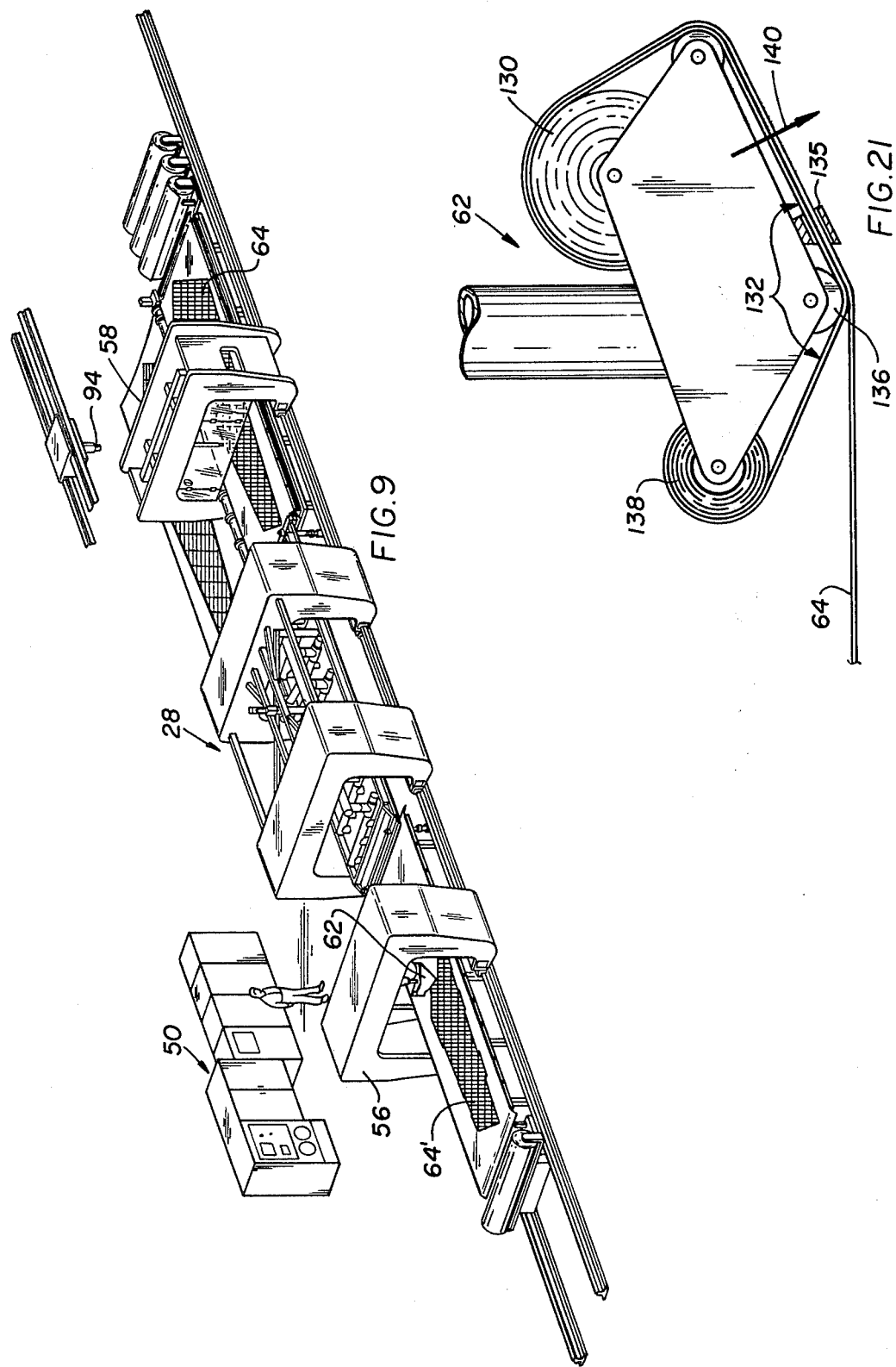

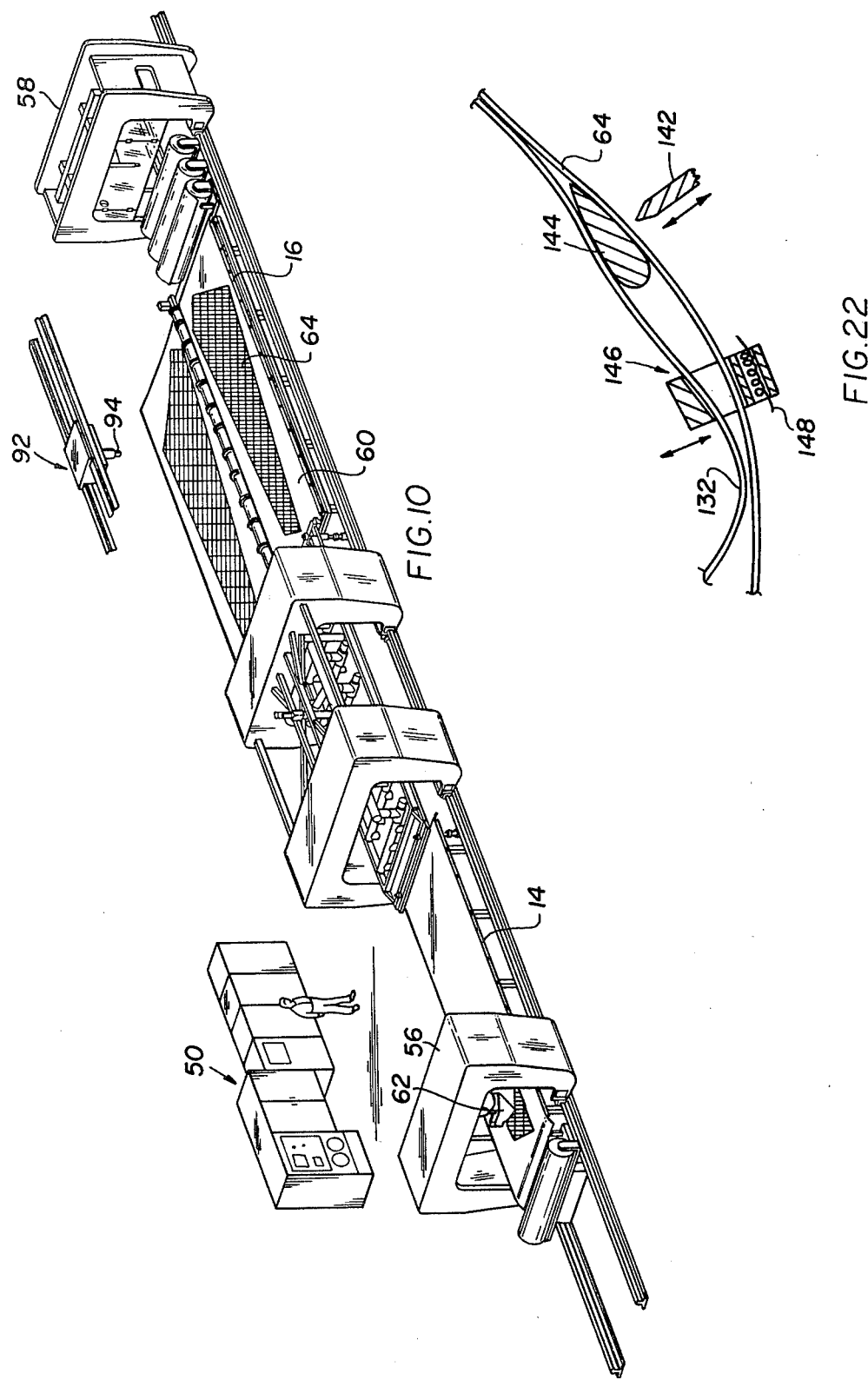

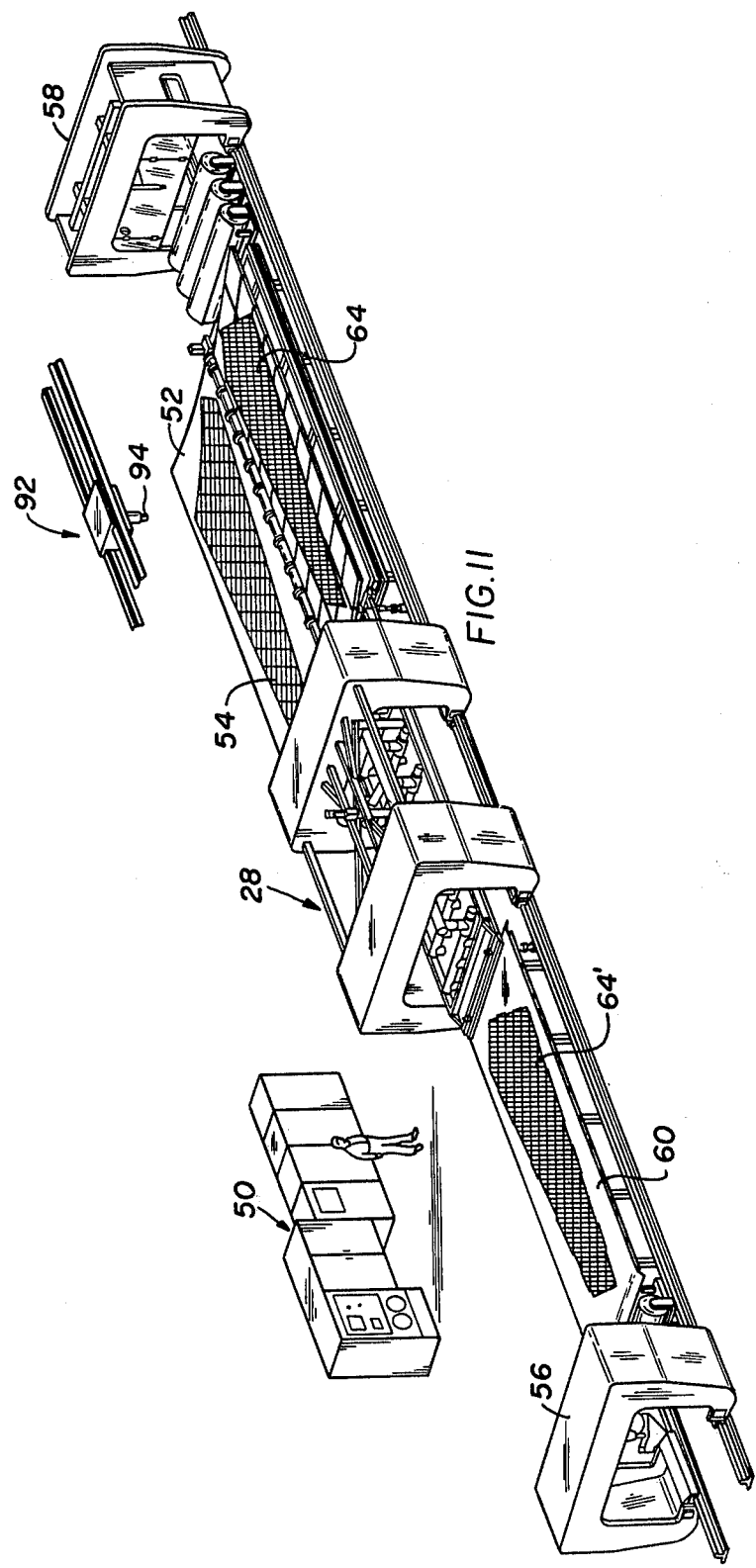

GANTRY FOR USE IN THE MANUFACTURE OF LAMINAR STRUCTURES

This is a division of application serial No. 814,472 filed July 11, 1977, now U.S. Pat. No. 4,133,711.

BACKGROUND

The purpose of this invention is to provide a practical means of automating the manufacture of advanced composite laminates. Over the past seven to eight years there have been two basic approaches to this task. One was to lay the composite tape material directly on to the mold form or bonding tool with a complex multi-axis composite tape laying head. This approach requires a minimal amount of manual handling of the composite material. However, this approach has limited appeal in actual practice because:

(1) It inhibits the flexibility of the designers options to get optimum performance from the material by restricting the type designs which can be used with this approach;

(2) It does not permit inspection and tracibility of each ply going into the structure; and (3) Machine complexity required for controlled laydown on compound curves causes lower equipment reliability, slower laydown rates and high equipment and programming costs.

Another approach, noted in the prior art to be the more commonly used production approach, has been to lay the composite tape directly on a transparent mylar. The material can be layed down by hand or with some form of mechanized tape laying head. It is then manually trimmed and laid on the bonding tool. The principal advantage of this approach is that it overcomes the three drawbacks of the first approach but has the penalty of additional handling and manufacturing operations. The system to be described by these Letters Patent is an automated handling system which integrates the necessary manufacturing processes into one machine.

FIGS. 1 through 11 are isometric detail of the assembly line according to this invention showing the operative process in stages starting with the machinery at rest, then preparing to lay a carrier material over a work table, laying the carrier material, laying a tape lamination on the material, preparing to pick-up the tape lamination and material, picking up the tape lamination and material, transferring the tape lamination and material while pulling another length of carrier material over the tape laying work table, depositing the tape laminations on a pattern work table, cutting a pattern of the tape laminations, preparing to remove the pattern of tape laminations and removing the pattern of tape laminations from the pattern work table;

FIG. 12 is an isometric view of the tape laying gantry with its outer panelling removed to show tape head mounting provisions;

FIG. 13 is a view of the means to move the various gantries of this invention along the assembly line showing a gantry leg in phantom to enable the reader to visualize location of the means;

FIG. 14 is an end view of the laser mounting and apparatus forming a preferred means to cut the desired panel at the pattern work table;

FIG. 15 is an isometric view of the means to dispense and size the protective film for the various tables;

FIGS. 16 through 19 are end views taken looking down the assembly line from just ahead of the pattern work table showing in chronological order the steps in automated transfer of the patterned tape laminations to a mold table;

FIGS. 21 and 22 are schematic illustrations of the apparatus within a tape head useable with this assembly line.

DETAILED DESCRIPTION

Figure 1:
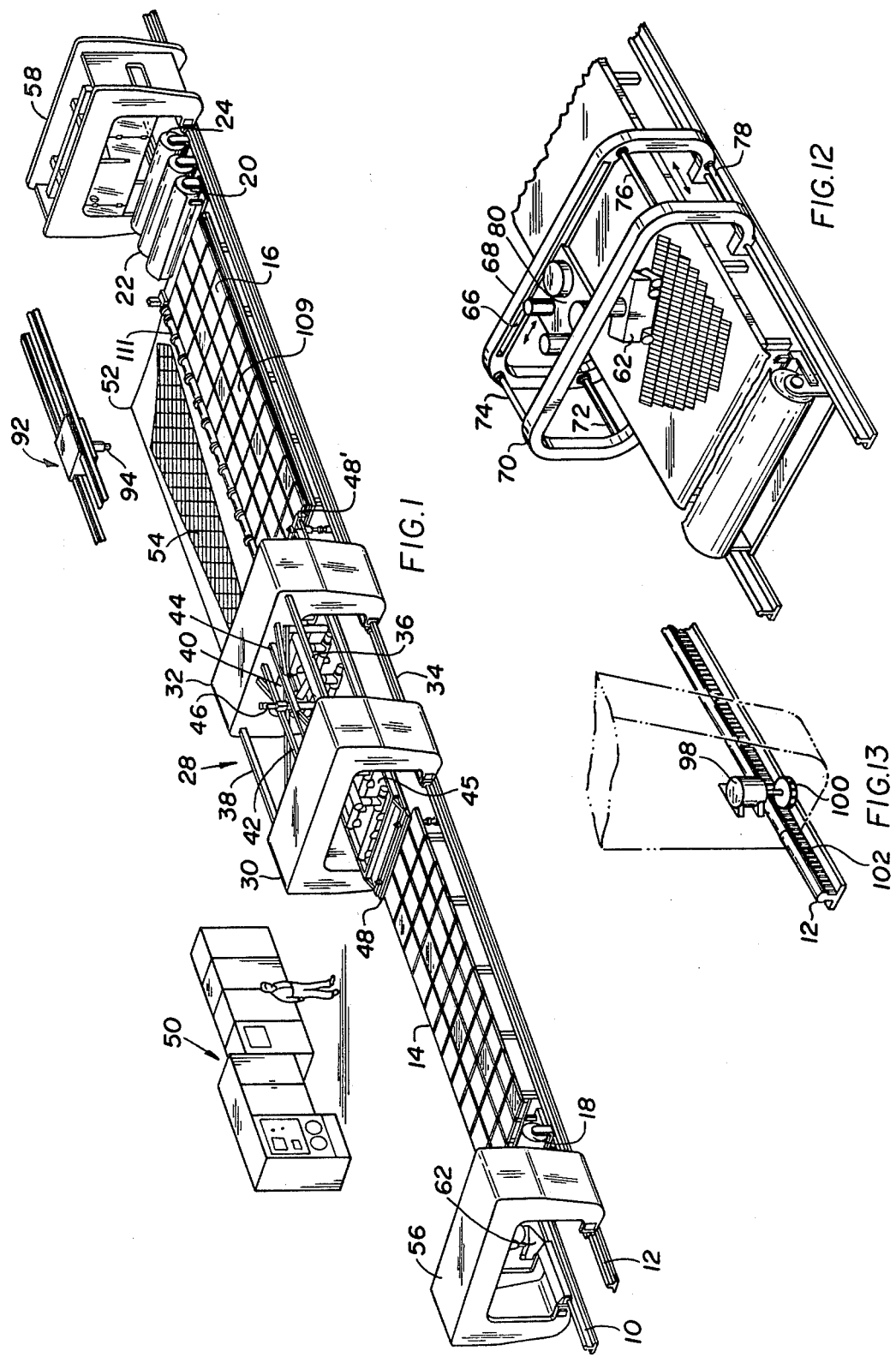

With more particular reference to FIG. 1 the production line therein depicted uses rail means 10 and 12 extending about and along a tape applying work table 14, a pattern or cutting work table 16 and rolls 18, 20, 22 and 24 at the ends of the line as shown. These rolls may be more particularly described as work table carrier material supply roll 18 such as a roll of polyethylene film or paper that will permit tacky lamination application thereon and subsequent non-damaging separation therefrom. As for rolls 20, 22 and 24 at the other end they may contain another roll of the aforesaid film or paper broadgoods and bleeder cloth to provide slip-sheets, peel plys and bleeder plys for application, as needed to a mold form.

As seen in FIG. 1 a transfer gantry 28 of an open frame construction with end supports 30 and 32 spaced by columns 34, 36, 38 and another (not shown) carried on rails 42 and 44 a vacuum transfer head 45 powered by a vacuum pump 46 on a translatable support 40. The head 45 carries clamping edges 48 and 48' at opposite ends that are able to clamp on an edge of the material on roll 18 (See FIG. 15) or rolls 20, 22 or 24 (edge 48') and pull such, respectively over tables 14 or 16.

A computer console 50 is used to control the line, and a mold table 52 with a mold form 54 thereon is also provided. That completes the description of the apparatus of the line save for the taping gantry 56 and the cutting gantry 58 which have been shown in their stowed attitudes at opposite ends of the rail means in order to more clearly view the total line.

Figures 8, 20:
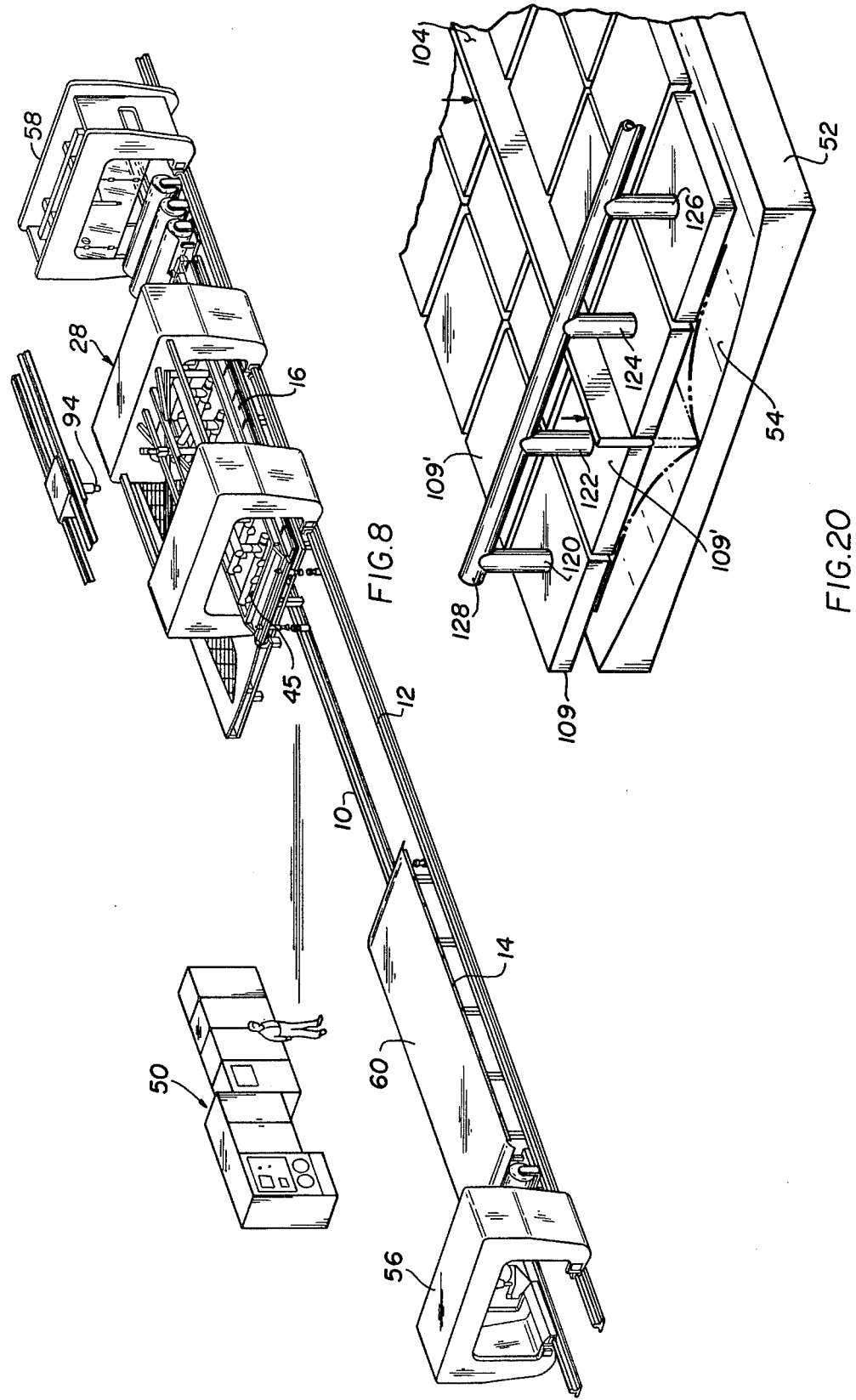
FIG. 20 is a partial view of the vacuum holding surface over the mold table with its means to prevent sail in transfer of the patterned tape laminations shown in full lines in its rest position and by phantom lines in its operative position.

Before passing on to a description of the various stations, it should be noted that table 16 has its surface 109 connected to an actuator structure 111 that will rotate surface 109 from its horizontal position on the table support to a position to deposit a patterned article on mold 54. A recessed contact arm 104 is shown by FIG. 20. It is operable before release of the article on mold 54 to hold the article to a number of areas of mold 54 so that on release it does not float.

The tape laying station consists of a modular vacuum hold down surfaces 109', on table 14 as disclosed by Pat. application Ser. No. 795,918 filed May 11, 1977, U.S. Pat. No. 4,066,249 for the material 60 (paper or polyethylene) and a tape laying head 62. The mini computer 50 controls the laydown of the composite material tapes 64 on the backup material 60 by the tape laying head 62 in a preprogrammed pattern.

As seen by FIG. 12 the tape head 62 is supported on tracks 66 on ends 68 and 70 connected by columns 72, 74, 76 and 78. Therefore, the head 62, which is rotatable under platform 80, its support on tracks 66 (one of which is shown), and by being movable along rails 10 and 12, is capable of laying tapes 64 in any directional orientation of a flat pattern.

Figure 6:
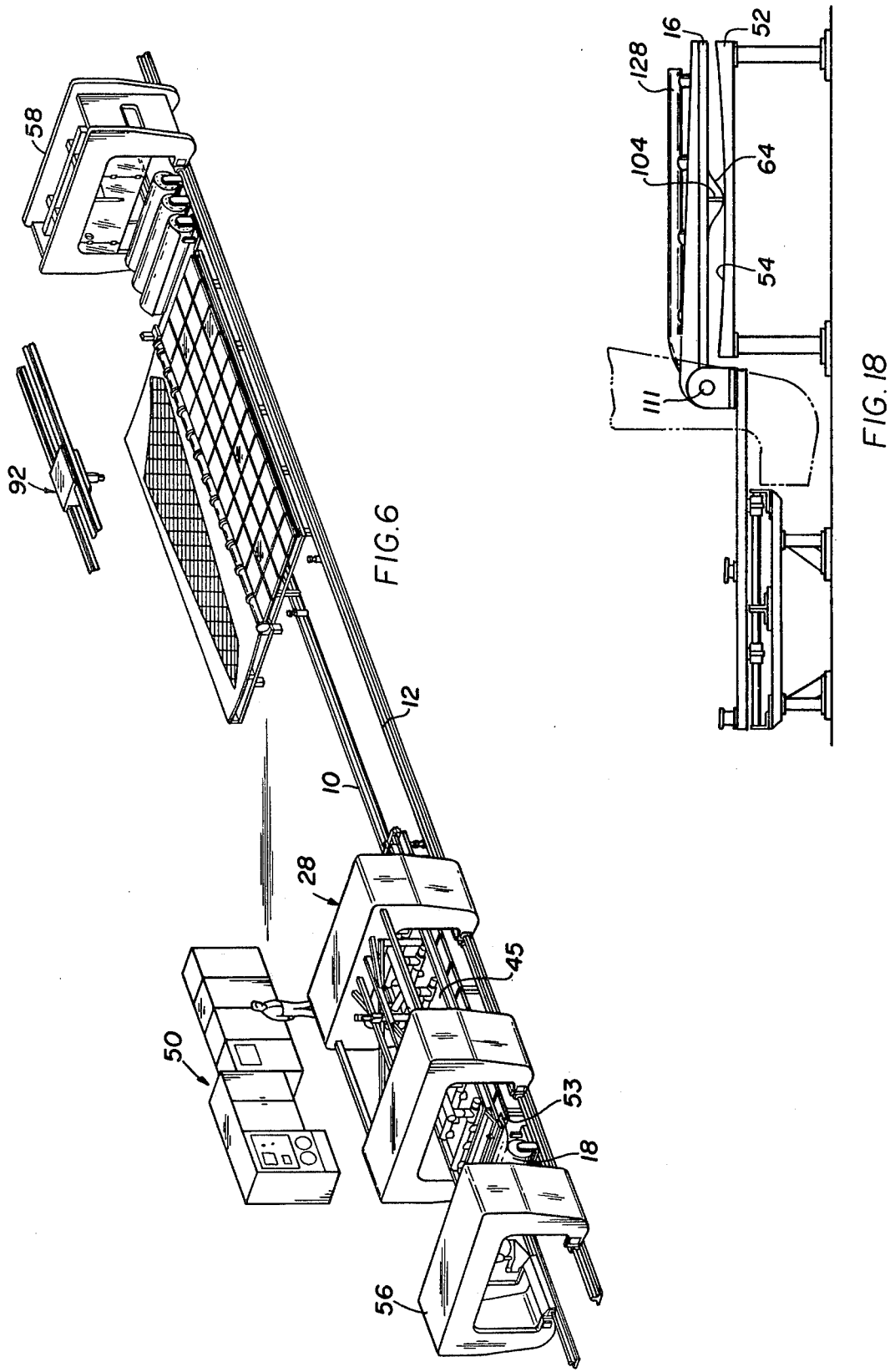

The transfer gantry 28 is used to move the lamination of tapes 64 between the laydown station and a cutting or trim station (See FIG. 6). This is done by the vacuum transfer head 45 moving over the tape laying station and with its vacuum holding system taking the lamination and backup material off the tape laydown work table 14. Clamp 48 on the edge of this transfer mechanism (See FIG. 15) will be simultaneously operated where its jaws 51 and 49 grip an edge 53 of the carrier material from roll 18 for the next ply and pull it over table 14 as the lamination of tapes 64 and backup material are transferred. The carrier material is fed via a delivery dispensing system 55 and cut by a translating disc 57 after a desired length is removed from roll 18. The transfer gantry 28 thereafter continues to move along rails 10 and 12 to overly the lamination and carrier material slightly above the pattern work table 16. The transfer table 45 is then moved down to the trim table by an air cylinder. The vacuum head is then operated whereby the lamination of tapes 64 is released from the transfer gantry and pulled to the pattern work table 16 by its vacuum system. The transfer gantry 28 returns to its park position between the work tables 14 and 16 awaiting the tape laying gantry to lay the next ply.

Going back for the moment to the dispensing system 55, the carrier material of roll 18 is fed via an idler roller 59 about a guide roller 61 of a vertically moveable frame shown in phantom lines by FIG. 15. The frame mounts on its face beyond the roller 61 a guide plate assembly having a fixed base 63 for a guide base support 65, a pivoting plate 67 for a guide edge 69 and an air tube 71 having a plurality of orifices 73 to direct air so as to fly the edge 53 outward and straight such that jaws 49 and 51 may when opened straddle the edge 53 and close upon same so as to pull material 60 evenly from the dispensing system 55. When the proper length is removed from roll 18 via dispensing system 55, the frame shown in phantom moves down such that material 60 is in tension between work table 14 and guide assembly base 63. Thereafter disc cutter 57 is caused to reciprocate across 75 cutting the material 60 to leave an edge 53, as shown by FIG. 15. It should be noted that a similar dispensing system is arranged for rolls 20, 22, 24 with means to vary height of edge 48' to pull the material from whichever of these it is desired to use.

It is also desired to note at this time that the vacuum transfer head is, as with table 14 and 16 designed to have a modular vacuum hold down surface such as is shown by U.S. Pat. No. 4,066,249 aforementioned. There is one small modification and that is the surface by being exposed to the tacky laminations is of a composition that the tacky laminations will not adhere thereto by reason other than the vacuum forces creating the desired pressure differential across the lamination and carrier material where under the head 45. Such a composition as has been successful to permit carrying to and dropping on the table 16 is a polyurethalene coating on the vacuum module faces to be exposed to tacky laminations.

A laser gantry 58, at rest to the far right, is operable along rails 10 and 12 to a position over the trim table. A laser 86 (See FIG. 14) is on platform 88. A mirror head 90 is supported by a rod 91 such that laser beam 93 may move across table 16 as gantry 58 moves it longitudinally thereof. The aluminum table surface 109 will reflect the $CO_2$ laser beam preventing damage to the table surface. When the trim pattern is complete, note contour pattern of laminations on mold form 54, the laser gantry clears the area to the right and the operator removes the scrap material from the table.

An overhead scan device 92, a television camera, provides a picture of the ply trim and fiber orientation for inspection. Camera 94 can be manipulated to provide an overall view, or a view of selected areas and details, of the laminate ply on table 16. The camera enables the operator to view the single laminate on a video screen. If pattern is correct he will record data and let process continue to transfer the lamination of tapes 64 on the contoured mold form 54.

Figure 3:
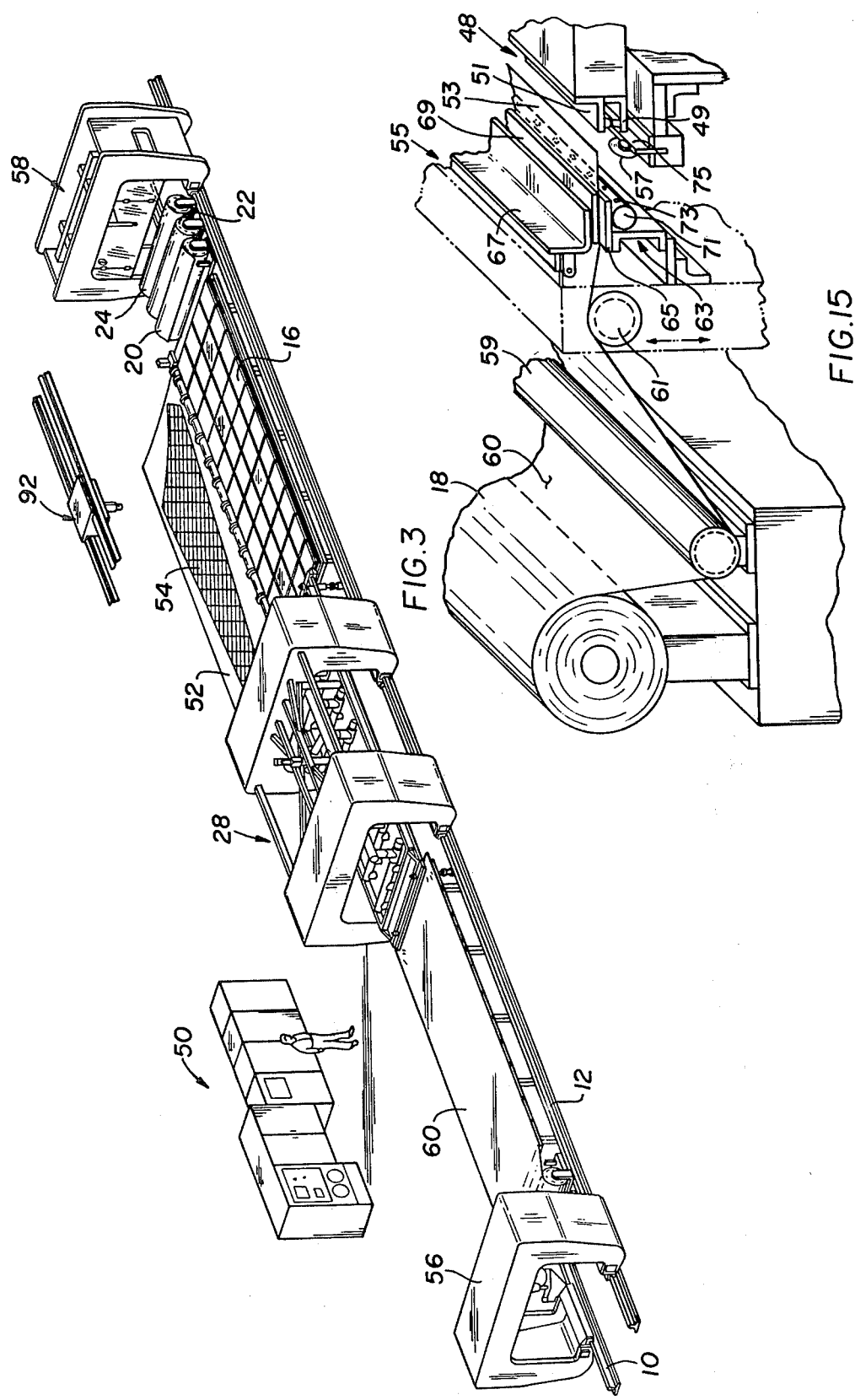

However, before going further into that operation the means to effect it are to be better described in reference to FIGS. 16, 17, 18 and 19. There, FIG. 16, it is shown that table 16 is an assembly of a stand 106 supporting a rod 108. Collars or sliding support sleeves 110 and 112 are affixed to a table base 114 having pillars 116 and 118 for the resting of a modular vacuum pattern work table 16. The table 16 is connected by arms 120 to a rotary actuator 111 itself affixed to base 114 along the extreme right side as seen in FIGS. 16, 17, 18 and 19. FIGS. 17, 18, 19 and 20 show the vacuum manifolding concept as set forth by the aforesaid U.S. Pat No. 4,066,249 whereby each vacuum module 109' is provided with tubular provisions 120, 122, 124 and 126 from a manifold pipe 128. (See FIG. 20) Appropriate valving as taught by the aforesaid patent application is operable from computer 50 to select in which module 109' a vacuum is drawn for its numerous small surface orifices (not shown). The contact arm 104 is actuated again by appropriate signals from control 50 to actuating cylinders (not shown) to assure contact of the lamination to the mold, whereupon, when the vacuum is released, the lamination falls, without sailing, into position on the mold form. Table 16, as seen by FIG. 19, then rotates back into position awaiting the next lamination. In the interim the operator may use transfer gantry 28 to pull material 21 from the rolls 20, 22 or 24 for sizing on table 16 and application to mold form 54. The operator thereafter strips backup from the mold form or bonding tool in preparation of succeeding laminate plys. After sufficient buildup per the program from the computer, the laminate plys are removed from table 52 to a curing area so that another lamination may be received by another form 54' placed on table 52 (See FIG. 3).

With reference to FIG. 13 there is shown a motor 98 that is within each of the ends of the gantries for driving a gear 100 cooperating with gear teeth 102 on the rail means (rail 12 being shown). This permits incremental, precise movement of these gantries and the motor 98 is of a reversible type for fore and aft movement. Appropriate leads from the motor can be connected via known shoe devices to the rail and thence to the computer console 50.

OPERATION

At the beginning of a work shift the assembly line is at rest as shown by FIG. 1. Therefore the FIG. 1 is to be labeled the start position with gantrys 56 and 58 at opposite ends of the rails 10 and 12 gantry 28 in an intermediate position. The control system 50 is activated by the operator. This control system is made up of an Allen-Bradley Model 7300 system with "floppy" disc mass-storage devices for parts programs to which has been added an Allen-Bradley Programmable Application Logic (PAL) package to control auxiliary functions such as tape shearing, broadgoods dispensing and transfer function of the assembly line, as will be known to one skilled in the art.

By way of a bit further explanation of this control system it is such as to direct the motions of tape 62 and its gantry 56, the shearing of the tape of appropriate lengths and in order to continue laying tape the lift-turn-index function that is necessary. Actually the shearing etc. is controlled by the (PAL) whereas the path geometry of the tape laying is from the "floppy" disc (a low-cost, high-density, high-speed, mass-storage device) from which information of path geometry may be buffered up into a main memory unit (preferably solid state) as required. This has been found to be a very advantageous control system by eliminating Mylar-tape-and-tape-reader operational storage and transfer method as well as circumventing the reliability problems heretofore plaguing numerical control machines. This controller also will control all laser 86 and gantry 58 motions as well as laser operation and table 16 rotation and removal of pattern to mold form 54. Programming will be writing numerical control parts programming source file in standard automated programmed tool format using Electronics Industry Association tape coding. Actually this is standard programming language for numerical control machinery and is fully software-supported through International Business Machines.

Figure 2:
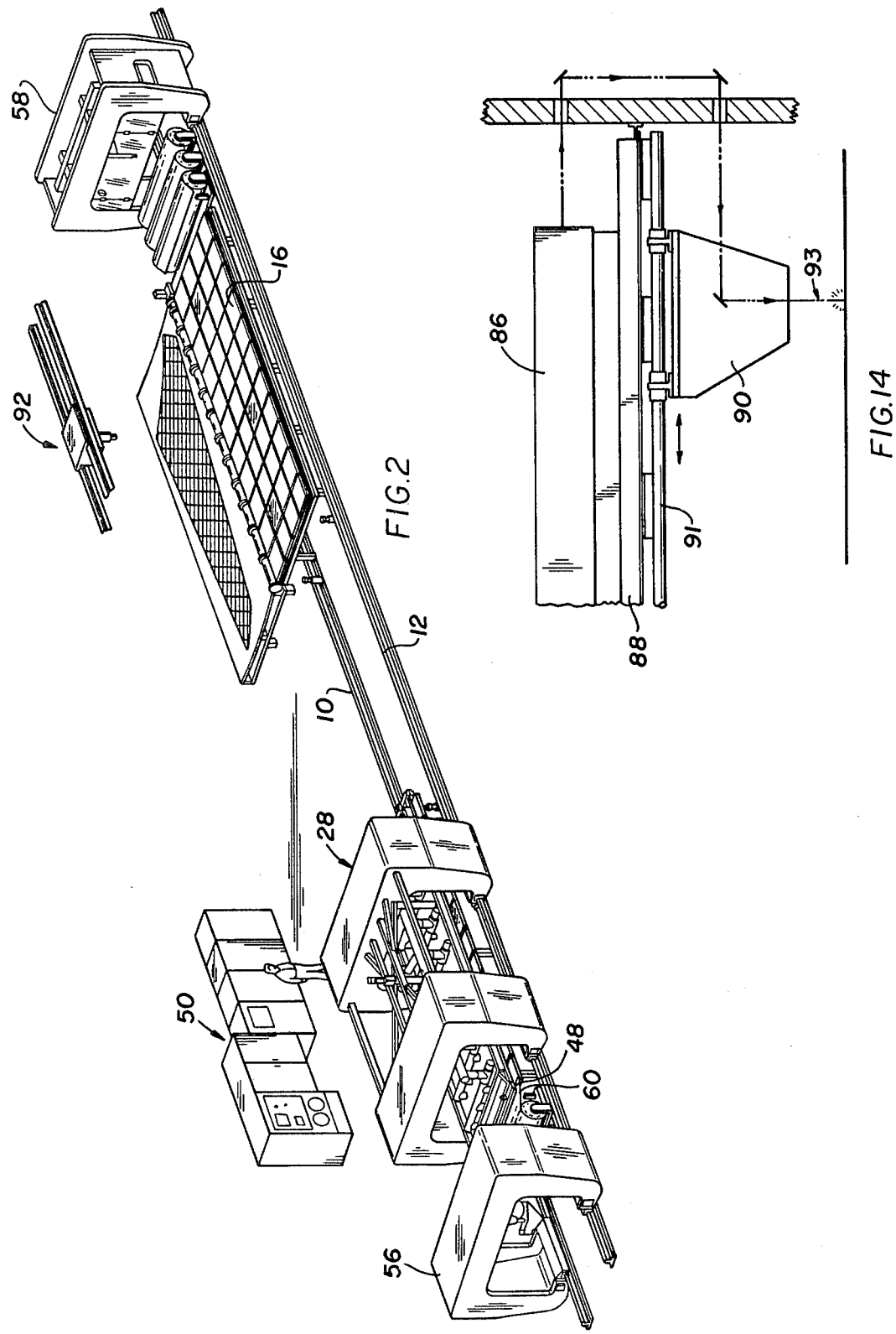

Upon actuation of the control system 50 the gantry 28 moves left (See FIG. 2) to place its edge 48 so that jaws 49 and 51 grip edge 53 of carrier material 60. (See FIG. 15) Then gantry 28 moves back to pull carrier material 60 over table 12 (See FIG. 3) whereupon controller 50 activates vacuum drawing apparatus of table 12 to hold material 60 thereon. Disc cutter 57 is then moved across the material 60, to size the carrier material to cover the table (See FIG. 15).

Figure 4:
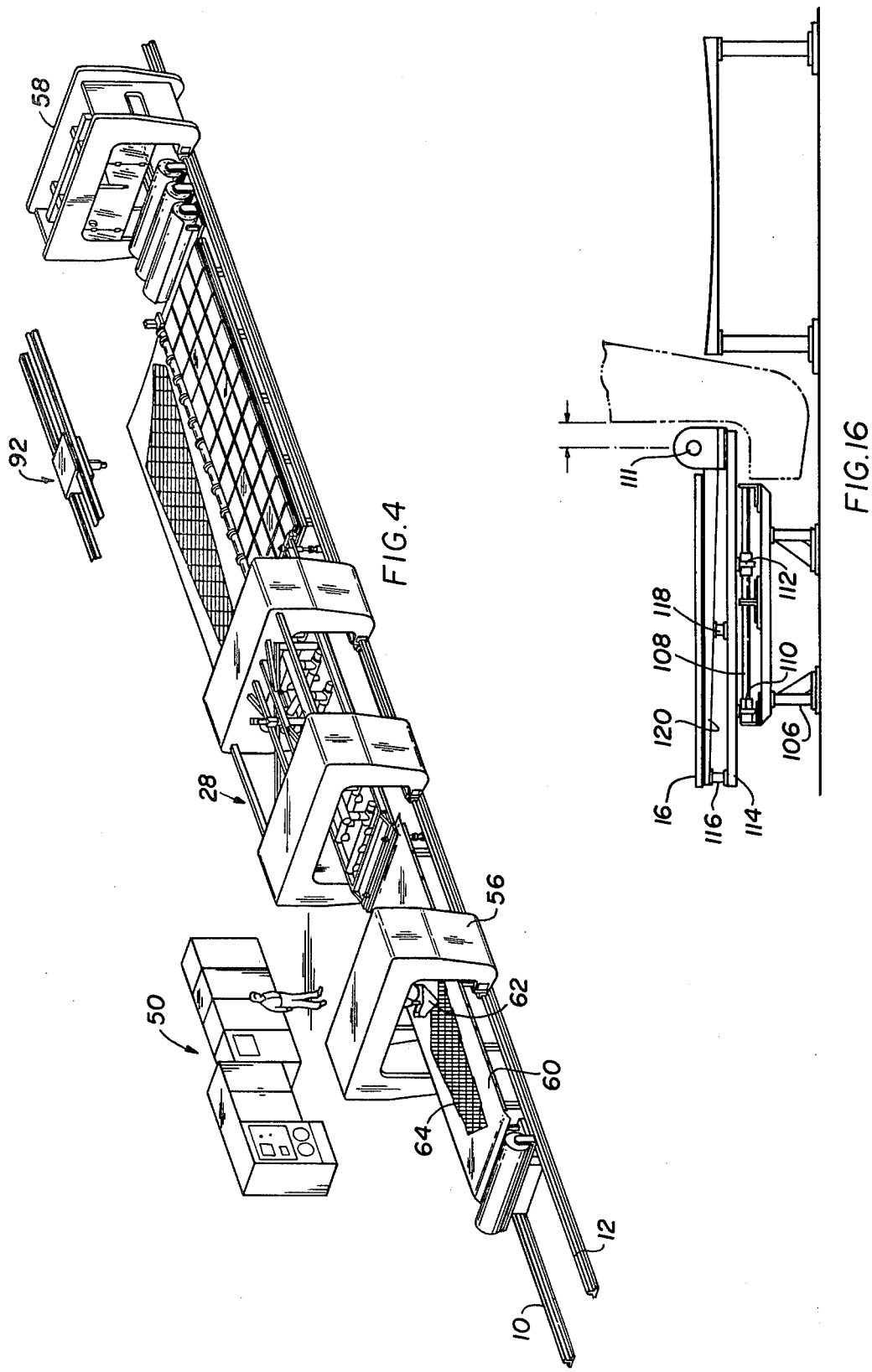

Thereafter control 50 activates the gantry 56 by energizing motors 98 to move it over table 14 (See FIG. 4). Then the tape head 62 is operated to lay down a tacky tape (i.e. a lamination of boron filaments and epoxy resin) from a feed reel where it is wrapped with interleaved back-up material onto the carrier material in finite strips shown in FIG. 4 to be slightly askew to the longitudinal axis of the line along rails 10 and 12.

The Tape Dispensing head is used to lay the composite tape material on the carrier sheet held with a vacuum to the laydown table. The dispensing head has four principal axes of motion
- o X-longitudinal motion provided by the Gantry Drive System
- o Y-Transverse motion across the table
- o I-Rotational motion of the tape dispensing head for ply orientation
- o J-Rotational motion of the tape sheer mechanism within the tape dispensing assembly for proper shear angle cutoff With specific reference to FIG. 21 the tape material is stored on a tape reel 130 with composite tape separated by a continuous carrier paper 132 of the same width as the composite tape 64. The material is threaded through a shear assembly along line 140 to be further described with reference to FIG. 22. The material then passes through an alignment shoe 135 and under an application roller 136. At this point the paper 132 only continues to the paper take up reel 138 and the composite tape material adheres to the carrier sheet 60 on the laydown table. The application roller 136 is driven by the gantry and tape head linear motions and provides the motive power to pull the tape from the tape reel while an air motor can be applied to the carrier paper reel 138 to provide the tension and torque needed to re-reel the paper. Composite tape cutting is attained by stopping the machine at a preprogrammed position such that the tape will be cut at the proper position and angle for subsequent laydown. The actual shearing action (See FIG. 22) is done by a high velocity impact action of a cutter 142 and anvil 144 with tape interposed obtained by discharging a capacitor into a linearly actuated solenoid (not shown). Simultaneously a clamp 146 with heater coil 148 is actuated to re-attach the paper and composite material for a limited length after shear separation by the anvil assembly. The actual guidance and placement of the composite tape is dependent upon using the carrier paper as a form of handling conveyor to the application point. The lateral placement of the tape is determined by adjustment of the guide shoe 135 which mechanically guides the carrier paper and composite tape edges to the proper position at the application roller.

The action or travel of shear cutting blade 142 is such that tape 64 is cut while the paper of carrier material 132 is on the far side of the anvil 144 from the cutter 142.

Figure 5:
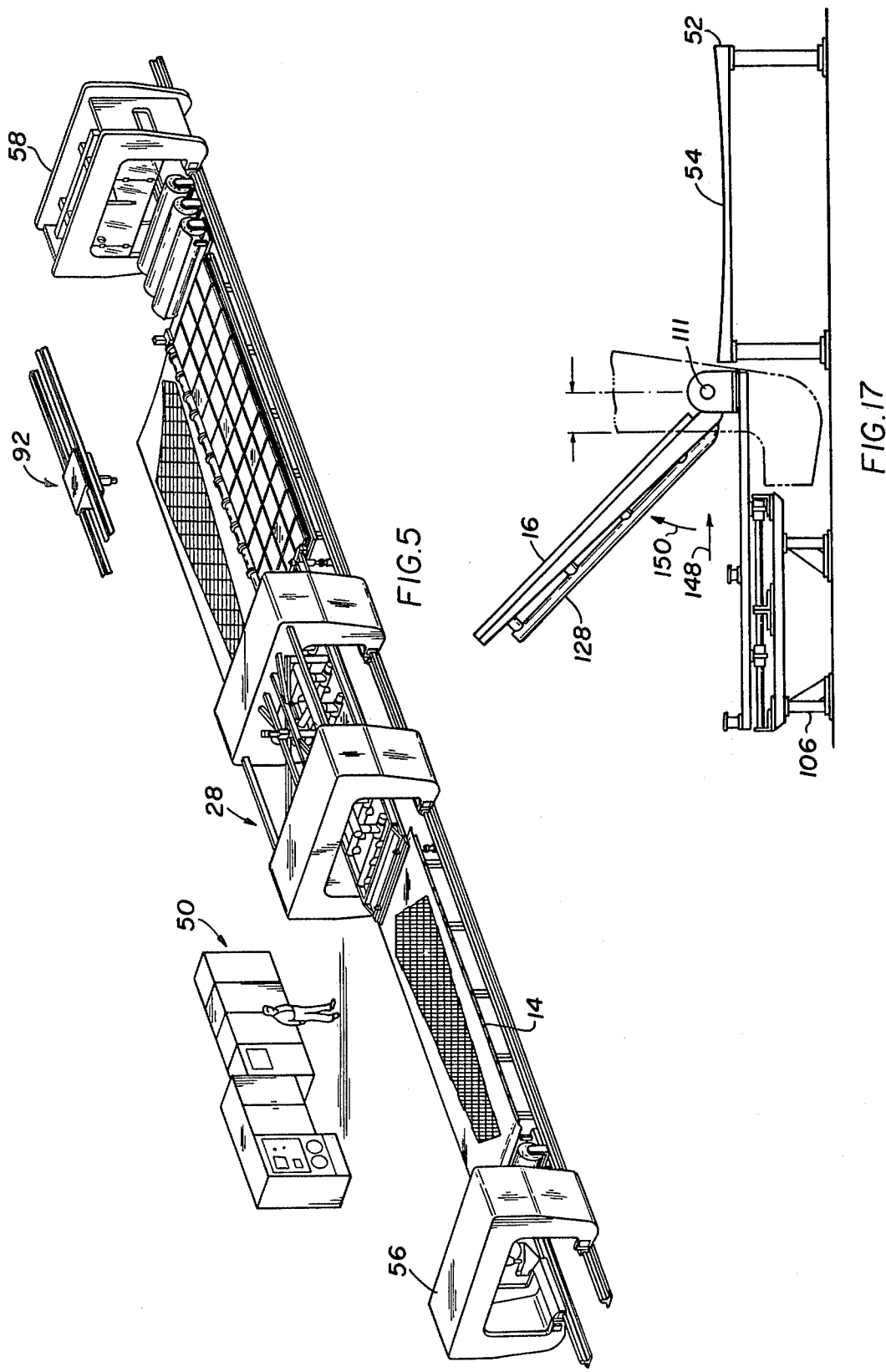
Figure 7:
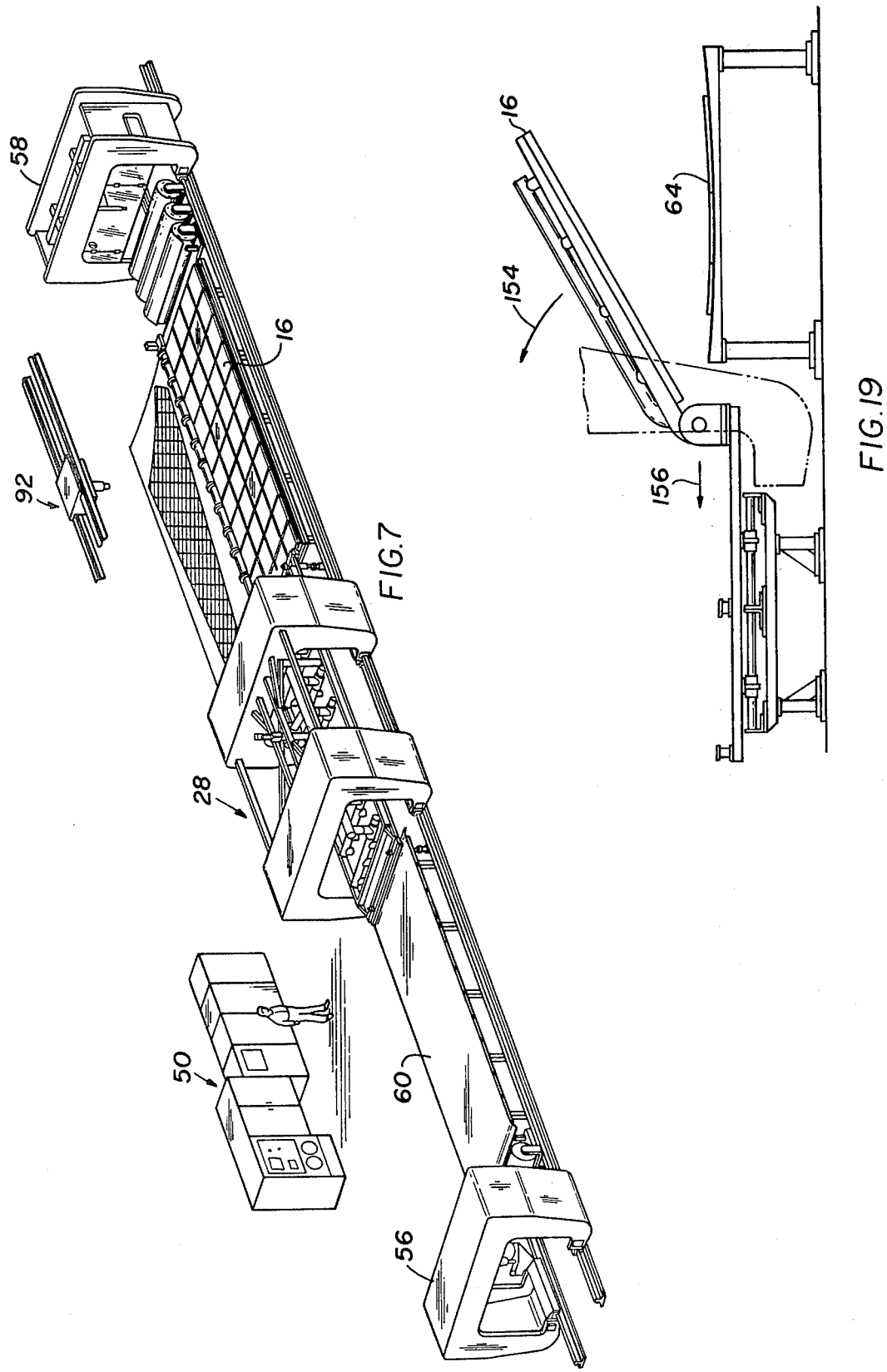

Next as seen in FIG. 5 the tape laying gantry is moved back to its rest position to open the area above table 14. (See FIG. 5) Thereafter the transfer gantry 28 is moved such that modular vacuum head 45 is over the boron/epoxy tape and carrier material and its vacuum apparatus energized to pick-up this tape and material. (See FIG. 6) At the same time jaws 49 and 51 grip the material edge 53 at the dispensing system adjacent roll 18. As a result carrier material is pulled over table 14 as gantry 28 moves the tapes and carrier material to pattern work table 16, also having a modular vacuum holding surface as aforedescribed in reference to FIG. 20. This step is shown by FIG. 7. Upon the cutting of the material 60 and the holding thereto on table 14 (See FIG. 8) the gantry 28 is further translated by control 50 operation of its motors 98 to take the tape and material held to vacuum head 45 to table 16. There the modular (reflective) vacuum surface is energized as the vacuum head releases the tape 64 and its carrier material 60.

Thereafter, gantry 28 is parked intermediate the ends of the line (See FIG. 9) and gantry 58 is moved over pattern table 16 and gantry 56 is moved over layup table 14. Computer control 50 then operates the laser apparatus and gantry 58 to trim tape layup 64 while tape head 62 and gantry 56 are operated to layup another composite form 64'.

FIG. 10 shows the beginning of a new composite application where gantry 56 and tape head 62 are operated. Gantry 28 is parked in this FIG. with the previous composite 64' and carrier material 60 held thereby for subsequent delivery to table 16. While gantry 28 is so parked scan device 92 may have a free view of the table 16. Camera 94 projects the pattern on table 16 to a video screen so that an operator may determine if it has been correctly cut.

Next as seen by FIG. 11 the computer control means 50 parks gantries 56 and 58 so as to permit gantry 28 to move to its left to pick-up tape laminations 64' and carrier material 60 and to permit table 16's actuation to deposit laser patterned lamination 64 on mold form 54 on table 52. This operation is more particularly illustrated by FIGS. 16 through 19.

Specifically table 16 is moved in the direction of arrow 148 to position shown by FIG. 17 after removal of all gantries (shown by phantom lines) by the use of state of the art drives (not shown for drawing clarity). At the same table 16 is moved, as shown by arcuate arrow 150, upwardly by rotary actuator 111 until, as seen by FIG. 18 the table 16 overlies table 52 to the side of the assembly line, as seen by FIGS. 1 through 11. Thereupon the control means 50 acutates bar(s) 104 to force laminations 64 onto mold form 54 whereupon vacuum manifold 128 is closed off from the vacuum pump and opened to atmosphere or above atmosphere pressure to drop lamination 64 completely onto mold form 54. Contact by bar(s) 104 prevent sailing in such drop. When this has been done the table 16 is returned through the arc shown by arrow 154 of FIG. 19 and base 114 is retracted along line shown by arrow 156 to permit such to be oriented on the line to accept next form 64'.

Whenever sufficient plys are stacked on mold form 54 of table 52 it may be removed to a curing station and another mold form placed on table 52.

Having described an operative sequence of the production process of this invention it is now desired to claim such by these Letters Patent as follows:

We claim:

1. For use with a facility to manufacture laminar structures a gantry means to traverse a path to be taken in such manufacture, said gantry being comprised of:
   a frame having ends with side legs with columns connecting said ends to space said ends from one another, said side legs having drive means to provide for movement of said frame;
   a platform movably mounted to and between said ends, said platform being movable between the ends and within the side legs from one side to the other side of said frame;
   means to mount a composite tape laying a sizing device on said platform to be movable with and relative to said platform, said composite tape laying and sizing device including a rotatable support from said platform for a housing having a tape feeding roll for a tape with a separator backup, a tape laydown means and a separator take-up reel; and
   means operatively arranged in at least some of said side legs to operate said drive means to give controllable motion to said gantry.

2. For use with a facility to manufacture laminar structures a gantry means to traverse a path to be taken in such manufacture, said gantry being comprised of:
   a frame having ends with side legs with columns connecting said ends to space said ends from one another, said side legs having drive means to provide for movement of said frame;
   a platform movably mounted to and between said ends, said platform being movable between the ends and within the side legs from one side to the other side of said frame;
   means to mount a laser operatively associated by means to the platform to provide a cutting laser beam movable with and within the gantry to cut a desired pattern of the laminar structure; and
   means operatively arranged in at least some of said side legs to operate said drive means to give controllable motion to said gantry.

3. The apparatus of claim 2 wherein the laser is fixed to the platform and a system of mirrors is used to provide the laser cutting beam to a movable head directing said cutting beam downwardly, said moveable head being slideable along rod means supported by said platform.

* * * * *

UNITED STATES PATENT AND TRADEMARK OFFICE
CERTIFICATE OF CORRECTION

PATENT NO. : 4,208,238

DATED : Jun. 17, 1980

INVENTOR(S) : Arthur August and John G. Huber

It is certified that error appears in the above-identified patent and that said Letters Patent are hereby corrected as shown below:

Column 3; line 41, insert --- plate --- before "assembly.

Column 3; line 42, insert --- plate --- before "75".

Column 4; line 61, insert --- and --- after "12".

Column 5; line 4, insert --- head --- after "tape".

Column 6; line 62, delete "16' s" and insert therefor --- 16's ---.

Column 8; line 1, delete "a" second occurrence and insert therefor ---and---.

Signed and Sealed this

Ninth Day of September 1980

[SEAL]

Attest:

SIDNEY A. DIAMOND

Attesting Officer

Commissioner of Patents and Trademark: